United States Patent [19]

Chao

[11] Patent Number: 5,709,340
[45] Date of Patent: Jan. 20, 1998

[54] ARTICLE HAVING MICROENCAPSULATED ADHESIVE THEREON

[75] Inventor: Hung Ya Chao, Dayton, N.J.

[73] Assignee: Moore Business Forms, Inc., Grand Island, N.Y.

[21] Appl. No.: 516,876

[22] Filed: Aug. 18, 1995

Related U.S. Application Data

[62] Division of Ser. No. 997,558, Dec. 28, 1992.

[51] Int. Cl.$^6$ .............................. B32B 3/26; B65D 27/16; G09F 3/10

[52] U.S. Cl. ......................... 229/80; 264/4.3; 264/4.33; 264/4.7; 283/71; 428/321.5; 428/402.2; 428/402.21; 523/176

[58] Field of Search .................... 264/4.3, 4.33, 264/4.6, 4.7; 428/402.2, 402.21, 321.5; 523/176; 411/258; 156/334; 283/71; 229/80; 493/265

[56] References Cited

U.S. PATENT DOCUMENTS

| | | | |
|---|---|---|---|
| 3,317,433 | 5/1967 | Eichel | 523/176 X |
| 3,429,827 | 2/1969 | Ruus | 264/4.7 |
| 3,523,906 | 8/1970 | Vrancken et al. | 264/4.6 |
| 3,657,379 | 4/1972 | Hilbelink et al. | 428/402.2 X |
| 3,725,501 | 4/1973 | Hilbelink et al. | 428/402.2 X |
| 3,767,211 | 10/1973 | Amphlett | 156/309 X |
| 3,791,980 | 2/1974 | Goldsmith | 264/4.1 X |
| 3,872,023 | 3/1975 | Baum et al. | 428/402.22 |
| 3,960,757 | 6/1976 | Morishita et al. | 427/213.36 |
| 4,001,480 | 1/1977 | Shank | 264/4.1 X |
| 4,066,568 | 1/1978 | Nakazawa et al. | 428/402.2 X |
| 4,076,774 | 2/1978 | Short | 264/4 |
| 4,098,736 | 7/1978 | Li et al. | 428/402.2 X |
| 4,135,322 | 1/1979 | Lillibridge | 428/321.5 X |
| 4,273,827 | 6/1981 | Sweeney et al. | 411/82 X |
| 4,389,330 | 6/1983 | Tice et al. | 264/4.1 X |
| 4,497,916 | 2/1985 | Cooke et al. | 523/176 |
| 4,517,141 | 5/1985 | Dahm et al. | 264/4.7 |
| 4,681,806 | 7/1987 | Matkan et al. | 264/4.3 X |
| 4,861,627 | 8/1989 | Mathiowitz et al. | 264/4.3 X |
| 4,865,938 | 9/1989 | Sakai et al. | 428/402.21 X |

FOREIGN PATENT DOCUMENTS

| | | |
|---|---|---|
| 0 133 353 | 7/1984 | European Pat. Off. . |
| 0 334 095 | 3/1989 | European Pat. Off. . |
| 4249517 | 9/1992 | Japan . |
| 2 107 670 | 10/1992 | United Kingdom . |
| WO92/16290 | 10/1992 | WIPO . |

*Primary Examiner*—Richard D. Lovering
*Attorney, Agent, or Firm*—Finnegan, Henderson, Farabow

[57] ABSTRACT

A microencapsulated adhesive and a method for producing that microencapsulated adhesive are disclosed. The adhesive is produced from a solvent-based adhesive composition such as a styrene butadiene rubber composition an acrylic. The solvent-based adhesive composition may be encapsulated by interfacial polymerization, gelatin/gum arabic coacervation or melamine/formaldehyde encapsulation. The solvent is removed from the microcapsules by heating or reduced pressure to form an adhesive that is non-tacky, but becomes tacky upon application of external forces, such as shearing. The microencapsulated adhesive composition may be used, among other applications, as an adhesive for stamps or envelopes.

3 Claims, No Drawings

5,709,340

ARTICLE HAVING MICROENCAPSULATED ADHESIVE THEREON

This is a division of application Ser. No. 07/997,558, filed Dec. 28, 1992 pending.

BACKGROUND OF THE INVENTION

The present invention relates to microencapsulated adhesives and processes for producing such microencapsulated adhesives. More particularly, the invention relates to a process for microencapsulating solvent-based adhesives to produce an adhesive composition that is initially non-tacky but exhibits tacky properties upon application of external forces, such as shearing.

Adhesive compositions are generally tacky and gluey. However, there are numerous applications where it would be beneficial to mask the tacky nature of the adhesive prior to its use. Examples of such applications include adhesive materials for stamps or envelopes.

One potential way of rendering adhesives non-tacky is to microencapsulate the adhesive. Various attempts have been made to encapsulate adhesives such as hot melt ethylene/vinyl acetate copolymers and styrene/isoprene/styrene-type block copolymers. However, due to their high molecular weight and high viscosity, these copolymers tend to be solids at room temperature and precipitate when emulsified, and thus are very difficult to microencapsulate.

It is an object of the present invention to produce an adhesive composition that is initially non-tacky but can be made tacky when desired.

Another object of the present invention is to provide an adhesive composition that can be microencapsulated.

Another object of the present invention is to provide a solvent-based adhesive that is capable of being microencapsulated.

A further object of the present invention is to provide a microcapsule that is sufficiently porous to allow solvent to diffuse through its walls.

The present inventor has found that solvent-based adhesive compositions can be microencapsulated by well-known microencapsulation techniques, and then the solvent in these compositions can be removed from the microcapsules by means such as heating or reduced pressure. These microencapsulated adhesives are initially non-tacky, but when external forces such as shearing are applied, the microcapsules break and the tacky adhesive is exposed.

SUMMARY OF THE INVENTION

To achieve the objects and in accordance with the purpose of the invention, as embodied and broadly described herein, the invention comprises a method of producing a microencapsulated adhesive by providing a solvent-based adhesive composition and encapsulating that solvent-based adhesive composition in microcapsules. At least a portion, and preferably substantially all, of the solvent is then removed from the microcapsules by subjecting the microcapsules to a selected temperature and pressure for a time sufficient to cause at least a portion, and preferably substantially all, of the solvent to escape through the microcapsule walls. This can be done by, for example, subjecting the microcapsules to an increased temperature, a reduced pressure, or a combination thereof, to cause the solvent to diffuse out of the microcapsules.

In another aspect of the present invention, there is provided a microencapsulated adhesive composition comprising a solvent-based adhesive which may be either styrene butadiene rubber or an acrylic, encapsulated in microcapsules. This composition functions as an adhesive that is initially non-tacky but exhibits tacky properties upon application of external forces, such as shearing. Specifically, upon application of an external force, such as shearing, at least some of the microcapsules are broken and the adhesive from within the microcapsules is exposed.

In a further aspect of the present invention, there is provided a microencapsulated adhesive composition produced by microencapsulating a solvent-based adhesive. At least a portion, and preferably substantially all, of the solvent is removed from the microcapsules by subjecting the microcapsules to a selected temperature and pressure for a time sufficient to cause at least a portion, and preferably substantially all, of the solvent to diffuse through the microcapsule walls. The adhesive that is formed is initially non-tacky but exhibits tacky properties upon the application of external forces, such as shearing.

In a further aspect of the invention, there is provided an article such as a stamp or an envelope that has, applied to at least a portion of its surface, a microencapsulated solvent-based adhesive composition selected from styrene butadiene rubber and an acrylic.

Additional objects and advantages of the invention will be set forth in part in the description which follows, and will become apparent from the description, or may be learned by practice of the invention. The objects and advantages of the invention can be realized and attained by means of the elements and combinations particularly pointed out in the appended claims.

DETAILED DESCRIPTION OF THE INVENTION

In accordance with the present invention, microencapsulated adhesives are produced by encapsulating solvent-based adhesives, followed by removing at least a portion, and preferably substantially all, of the solvent from the microcapsules. The solvent could be removed by, for example, increased heat or reduced pressure, or a combination thereof. The solvent-based adhesives of the invention generally have very low to medium viscosity and thus are capable of being encapsulated. It is to be understood that potentially any solvent-based adhesive that is capable of being microencapsulated, whose solvent is capable of being removed through microcapsule walls and that is useful as an adhesive is within the scope of the present invention. Following encapsulation, at least a portion, and preferably substantially all, of the solvent is removed from the microcapsules by means such as heating or reducing the pressure for a time sufficient to cause the solvent to escape through the microcapsule walls by, for example, diffusion.

In accordance with the invention, the solvent-based adhesives are preferably styrene butadiene rubber compositions or acrylic adhesives. However, other solvent-based adhesives can be used in the invention, such as polyvinyl acetate and the like. An example of styrene butadiene rubber adhesives that can be used in the invention is, among others, Silaprene M6440, available from Uniroyal. Examples of acrylic adhesives that can be used in the invention include, but are not limited to, Gelva 2495, 2450 and 2480, available from Monsanto.

In accordance with the invention, a sufficient amount of the solvent can be removed from the microcapsules by heating to a temperature and for a period sufficient to cause the solvent to diffuse through the microcapsule walls.

Alternatively, the microcapsules may be subjected to a reduced pressure for a period sufficient to cause the solvent to evaporate and escape from the microcapsules. For the adhesive compositions used by the present inventor, heating to a temperature of about 95° C. for about 2 hours has been found to be sufficient to remove substantially all of the solvent from the microcapsules. Appropriate temperatures and times can be determined by those skilled in the art based in part on the desired properties of the adhesive.

In accordance with the invention, the adhesive can be microencapsulated by those techniques known in the art, including interfacial polymerization, gelatin/gum arabic coacervation and melamine/formaldehyde encapsulation. A preferred encapsulation technique is interfacial polymerization. The walls of the microcapsules are preferably comprised of polyamide or polyurea.

The porosity of the microcapsules of the invention can be easily controlled by techniques known to those skilled in the art, such as by optimizing the degree of crosslinking of the microcapsules walls. Thinner capsule walls will allow solvent to diffuse out of the microcapsules easier than thicker capsule walls.

The interfacial polymerization method that may be used in accordance with the invention involves mixing the solvent-based adhesive composition to be microencapsulated together with either an acid chloride or an isocyanate. The resultant mixture is emulsified in an emulsification agent to obtain an oil-in-water emulsion. A polyfunctional amino compound is then added into the emulsion, whereby microcapsule walls are formed around each microparticle of oil. In accordance with the invention, when an acid chloride is mixed with the solvent based adhesive, a polyamide microcapsule is produced—when an isocyanate is mixed with the solvent based adhesive, polyurea capsules are formed. After the solvent-based adhesive composition is microencapsulated, the entire composition can be heated or subjected to reduced pressure to remove the solvent from the microcapsules.

The gelatin/gum arabic coacervation encapsulation method that may be used in accordance with the present invention involves first emulsifying the core material into a gelatin solution to obtain an oil-in-water emulsion. The emulsion is mixed with a gum arabic solution. The system is then pH adjusted or diluted to cause the gelatin/gum arabic to coacervate. Thereafter, the capsules are post-treated with a cross-linking agent, such as formaldehyde, glutaraldehyde, or other similar known compounds.

The melamine-formaldehyde encapsulation method that may be used in accordance with the present invention involves first emulsifying the core material into a carboxyl methyl cellulose solution or a poly(styrene-maleic anhydride) solution to obtain an oil-in-water emulsion. The emulsion is then mixed with a melamine-formaldehyde precondensate solution. The system is then pH adjusted, followed by heating to initiate polymerization of the precondensate to a high molecular weight compound. The presence of the carboxyl methyl cellulose or poly(styrene-maleic anhydride) solution helps the polymerized melamine-formaldehyde to deposit onto the core material surfaces, thereby encapsulating the core.

Acid chlorides that can be used in the invention to produce polyamide microcapsules include, but are not limited to: terephthaloyl chloride, isophthaloyl chloride, 1,3,5-benzenetricarboxylic acid chloride, sebacyl dichloride, 4,4-sulfonyldibenzoyl chloride, 1,3-benzenedisulfonyl chloride, 1,4-benzenedisulfonyl chloride, or mixtures thereof. A preferred acid chloride for use in the invention is a mixture of isophthaloyl chloride and terephthaloyl chloride.

Isocyanate compounds that can be used in the invention to produce polyurea microcapsules include, but are not limited to: 2,4- and 2,6-diisocyanatotoluene, 4,4'-diisocyanatodiphenyl methane, 1,3,5-trimethylbenzene-2,4-diisocyanate, 1,6-diisocyanato-hexane, polymethylene polyphenyl isocyanate, polyisocyanates which additionally contain biuret-, allophanate-, and carbodiimide groups, and the like. A preferred isocyanate for use in the invention is Desmodur N-100, a polyfunctional aliphatic isocyanate compound containing a biuret linkage commercially available from Mobay Chemicals.

Examples of polyfunctional amines that can be used in the invention include, but are not limited to: ethylene diamine, diethylene triamine, triethylene tetramine, tetraethylene pentamine, 1,6 hexanediamine, polyethyleneimine, bis-hexamethylenetriamine, and the like. A preferred polyfunctional amine for use in the invention is diethylene triamine.

The emulsification agents that can be used in accordance with the invention include those compounds that contain both hydrophilic and hydrophobic groups in the same molecule. Examples include, but are not limited to: partially hydrolyzed polyvinyl alcohol, starch derivatives, cellulose derivatives, polyacrylamide, and the like. A preferred emulsification agent for use in the invention is partially hydrolyzed polyvinyl alcohol.

The following examples are illustrative of the invention embodied herein and are not to be considered limiting.

EXAMPLE 1

60 parts of Gelva 2495 was mixed with 1.02 parts of terephthaloyl chloride ("TCL")/2.39 parts of isophthaloyl chloride ("ICL"). The resultant mixture was emulsified into 110 parts of a 2% Vinol 523 solution in a Waring blender. Vinol 523 is a partially hydrolyzed polyvinyl alcohol, commercially available from Air Products and Chemicals. To this emulsion, 20 parts of an aqueous solution containing 1.38 parts of diethylenetriamine, 0.54 part of NaOH, and 0.71 part of sodium carbonate was added. The mixture was stirred at room temperature, under mild agitation, for about 16 hours. By then, the microcapsule formation reaction was completed. Particle size varied from about 5 to about 140 microns, with an average of about 45 microns.

The content was then heated to 95° C. for about 2 hours to extract the volatile solvent out of the system.

EXAMPLE 2

60 parts of Gelva 2480 was mixed with 1.02 parts of TCL/2.39 parts of ICL. The resultant mixture was emulsified into 110 parts of a 2% Vinol 523 solution in a Waring blender. To this emulsion, 20 parts of an aqueous solution containing 1.38 parts of diethylenetriamine, 0.54 part of NaOH, and 0.71 part of sodium carbonate were added. The mixture was stirred at room temperature, under mild agitation, for about 16 hours to complete the microencapsulation reaction. Particle size of the capsules varied from about 5 to about 160 microns, with an average of about 48 microns.

The content was then heated to 95° C. for about 2 hours to extract the volatile solvent out of the system.

EXAMPLE 3

60 parts of Gelva 2480 was mixed with 1.02 parts of TCL/2.39 parts of ICL. The resultant mixture was emulsified into 110 parts of a 3% Vinol 523 solution in a Waring blender. To this emulsion, 20 parts of an aqueous solution containing 0.54 part of NaOH, 1.38 parts of diethylenetriamine, and 0.71 part of sodium carbonate were added. The mixture was stirred at room temperature, under mild agitation, for about 16 hours to complete the microencapsulation reaction. Particle size varied from about 5 to about 155 microns, with an average of about 50 microns.

The content was then heated to 95° C. for about 2 hours to extract the volatile solvent out of the system.

EXAMPLE 4

60 parts of Gelva 2480 was mixed with 0.43 part of TCL/1.02 parts of ICL. The resultant mixture was emulsified into 105 parts of a 2% Vinol 523 solution in a Waring blender. To this emulsion, 20 parts of an aqueous solution containing 0.23 part of NaOH, 0.59 part of diethylenetriamine, and 0.30 part of sodium carbonate were added. The mixture was stirred at room temperature, under mild agitation, for about 16 hours to complete the microencapsulation reaction. Particle size varied from about 5 to about 140 microns, with an average of about 45 microns.

The content was then heated to 95° C. for about 2 hours to extract the volatile solvent out of the system.

EXAMPLE 5

60 parts of Gelva 2495 was mixed with 5.65 parts of Desmodur N-100. The resultant mixture was emulsified into 94 parts of a 2% vinol 523 solution in a Waring blender. To this emulsion, 20 parts of an aqueous solution containing 1.02 parts of diethylenetriamine was added. The mixture was stirred at 60° C. under mild agitation for about 2 hours. By then, the microcapsule formation reaction was completed. Particle size varied from about 5 to about 150 microns, with an average of about 40 microns.

The content was then heated to 95° C. for about 2 hours to extract the volatile solvent out of the system.

Each of the microcapsule compositions of Examples 1–5 was coated on a substrate, such as a 24# bond paper at a coating weight of about 5 to about 20 g/m$^2$ and dried in a heated oven at 90° C. for 1 minute. The coatings were completely non-tacky, yet under some shearing pressure, the tacky properties of the adhesives were obtained.

Other embodiments of the invention will be apparent to those skilled in the art from consideration of the specification and the practice of the invention disclosed herein. It is intended that the specification and examples be considered as exemplary only with a true scope and spirit of the invention being indicated by the following claims.

What is claimed is:

1. An article, having applied to at least a portion of its surface, a microencapsulated adhesive composition produced by microencapsulating a solvent-based adhesive; followed by removing at least a portion of the solvent from said microcapsules by subjecting the microcapsules to a selected temperature and pressure for a time sufficient to cause at least a portion of said solvent to diffuse through said microcapsule walls, thereby forming an adhesive composition that is initially non-tacky but exhibits tacky properties upon application of external forces.

2. A stamp, having applied to at least a portion of its surface, a microencapsulated adhesive composition comprising:

a solvent-based adhesive selected from the group consisting of styrene butadiene rubber and an arylic adhesive, encapsulated in microcapsules, wherein said microencapsulated adhesive is initially non-tacky but exhibits tacky properties upon application of external forces.

3. An envelope, having applied to at least a portion of its surface, a microencapsulated adhesive composition comprising:

a solvent-based adhesive selected from the group consisting of styrene butadiene rubber and an acrylic adhesive, encapsulated in microcapsules, wherein said microencapsulated adhesive is initially non-tacky but exhibits tacky properties upon application of external forces.

* * * * *